Dec. 28, 1926.
L. VON TOLNAY ET AL
1,612,079
PHOTOGRAPHIC PLATE
Filed Nov. 17, 1923
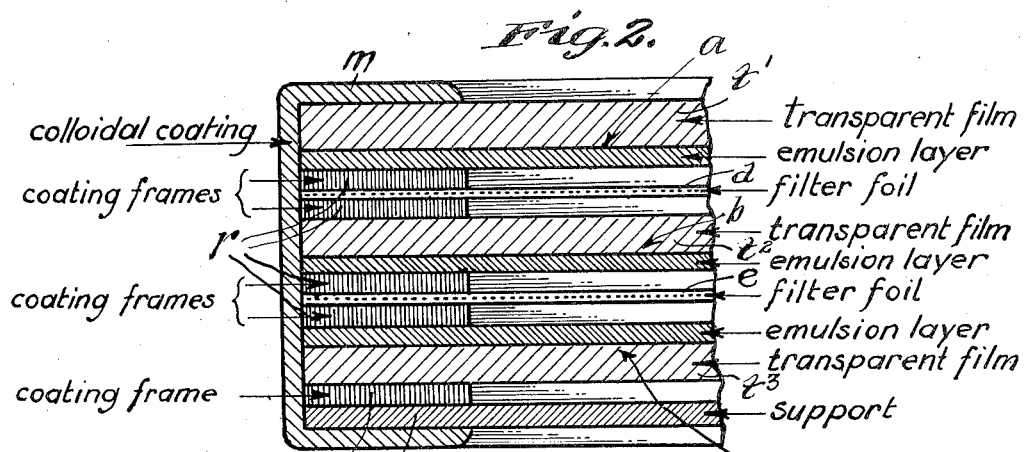
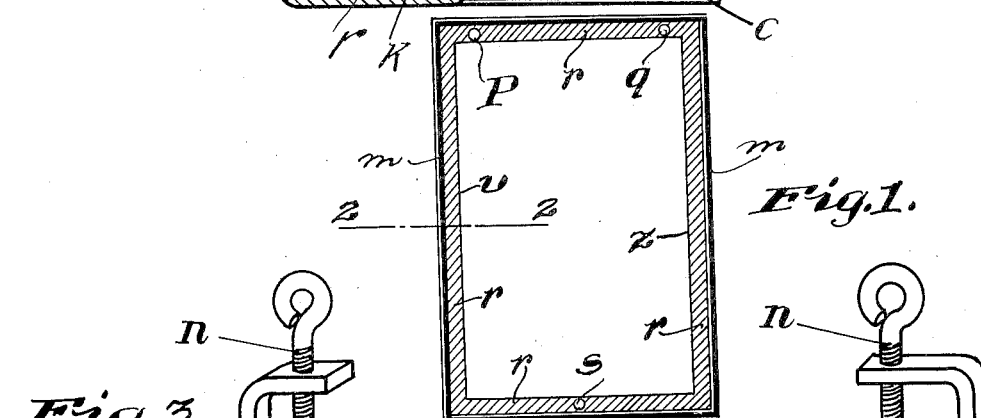
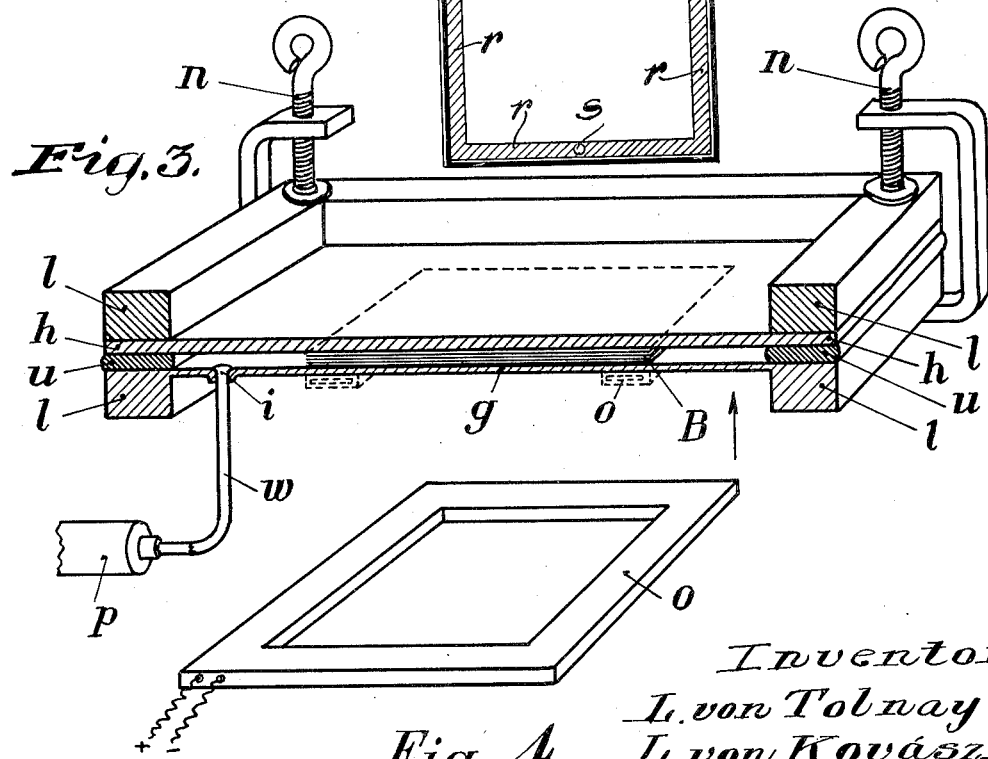
Inventors
L. von Tolnay
L. von Kovásznay Patented Dec. 28, 1926.

1,612,079

UNITED STATES PATENT OFFICE.

LUDWIG v. TOLNAY AND LADISLAUS v. KOVÁSZNAY, OF BUDAPEST, HUNGARY.

PHOTOGRAPHIC PLATE.

Application filed November 17, 1923, Serial No. 675,309, and in Hungary December 6, 1922.

The subject of this invention is a photographic plate, more particularly for three-colour photography (or chromoscopy), by means of which the negatives for indirect colour photography both for the subtractive and for the additive process can be obtained by a single exposure without the employment of special light filters and with any ordinary photographic camera.

The solution of the problem by the combination of the plates to form a single plate comprising three superposed layers has not been successful hitherto. Plates of this kind have already been proposed, which are made by combining three differently sensitized and differently coloured emulsions mounted on heterogeneous supports (glass and film). The sensitizing dyes, when used in the concentration required for obtaining the requisite filter action, considerably reduce the colour sensitiveness and the general sensitiveness, besides being chromatically incorrect. A further disadvantage of the plate is the different nature of the supports and more particularly the absence of optical contact, causing very injurious dispersion, diffraction and irradiation phenomena, all of which are prevented by the present invention. Plates having three superposed layers are also known, in which separately poured on layers are provided as filters, which however, as they are inseparable from the emulsion layers or the supports of the same, make it more difficult for the partial images to receive the same development. These plates also suffer from the disadvantage of having heterogeneous supports and from the absence of optical contact. It has also been proposed to mount the three dyed layers on a common, temporary support. Apart from other disadvantages the plate is useless for the reason that after exposure the elementary layers must be separated in the dark and must be thereupon transferred to special definite supports, during which process the correct register of the partial images must of necessity be lost.

The present invention overcomes the above difficulties and the new plate very fully satisfies the very different demands made on a three colour photographic plate.

The accompanying drawing shows diagrammatically a constructional example of the subject of the invention, Fig. 1 being a plan view.

Fig. 2 a cross-section on line 2—2 of Fig. 1, showing the plate before the air has been withdrawn and the scale being greatly enlarged in one direction.

Figure 3 is a perspective view showing the arrangement for evacuating the block, and Figure 4 is a perspective view showing the heating apparatus used in conjunction with the arrangement illustrated in Figure 3.

The new plate consists of the combination of three entirely independent component plates $a$, $b$, $c$ and of filter foils $d$, $e$, which are located between the said components and are also entirely independent of them, both the light sensitive layers $f_1$, $f_2$, $f_3$ of the component plates and the filters $d$, $e$ being sealed in a gas tight manner till immediately before development and held in constant optical contact by the atmospheric air pressure.

According to the invention the supports $t_1$, $t_2$ and $t_3$ of the emulsion layers $f_1$, $f_2$ and $f_3$ are homogeneous and consist of thin, colourless films made of transparent material such as cellulose, cellulose hydrate, acetyl cellulose, muscovite and the like, and having great tensile and shearing strength and a high modulus of elasticity, which prevents them from becoming deformed subsequently, for instance while being placed into and removed from the slide, and during treatment in baths and so on. The supports are final, i. e. there is no transfer of the emulsion layers during treatment. They are also very thin, while preserving their strength, thus preventing injurious reflections (irradiation and diffraction) as well as differences of focus between the emulsion layers and making it possible to copy from either side of the negative.

The supports are coated with three different emulsions $f_1$, $f_2$, $f_3$, viz the film $t_1$, which is first struck by the rays of light, with an emulsion having a high dispersion power, similar to the layer used in the Lippmann process, but more transparent and more sensitive to light. The emulsion $f_2$ of the second film $t_2$ is a silver bromide emulsion of medium sensitiveness and transparency and the emulsion $f_3$ of the third film $t_3$ is a highly sensitive ammoniacal emulsion.

The emulsion $f_1$ of the first component plate $a$ is sensitized with yellow chinoline dye, whereby both the sensitiveness of the layer is considerably increased (according to experiments by Luppo-Cramer about 40 times) and the layer becomes almost monochromatically blue-violet sensitive and at the same time is given great covering power. By the first layer being sensitized almost exclusively to the highly refractive part of the spectrum (the blue-violet part), the chromatic correctness of the first plate is ensured, without however having a bad effect on the second and the third plate. The layer $f_2$ of the second plate $b$ is sensitized in any known manner for red and the third plate $c$ in any known manner for green.

According to the invention extremely thin, but strongly dyed filters $d$, $e$ made preferably of gelatine foils are placed between the component plates, viz an orange filter $d$ between the first and the second plate and a green filter $e$ between the second and the third plate. In contradistinction to the known plates composed of a plurality of layers and coated with filter layers the gelatinal foils of the new plate are completely independent of the component plates, for making them readily removable, and the optical contact between the plates and the foils is maintained solely by the external air pressure.

The edges of the two gelatine foils $d$ and $e$ lying outside the field of view are provided with a narrow and extremely thin frame $r$ consisting of an adhesive substance, for instance guttapercha. The guttapercha strips are provided on both sides of each foil, so that there is a frame between each film and each foil. At an ordinary temperature the frames hardly adhere at all, adhere strongly to the layers on being only slightly heated (to about 50° C.) and provide a continuous gastight closure at the four edges. The three films and the filter foils between them are superposed in such a manner that the external closing surfaces are formed by the films $t_1$ and $t_3$. The block is thereupon laid on a support $k$ preferably made of black cardboard so that the third film $c$ lies directly on the card, which has a guttapercha frame $r$ on the side facing the film $c$.

The block consisting of three films, two filter foils and a support is then evacuated. This may be effected, for instance, in the following simple manner: The block B (see Figure 3) is placed on a gastight support, for instance a metal sheet $g$ which is wider and larger than the block itself, so that a margin is left around the block. The block is then covered by a plate $h$ of approximately the same size as the support $g$, which plate is similarly made of a gastight and elastic material, for instance celluloid or rubber, the edges of the support $g$ and covering plate $h$ being secured together in a gastight manner, for instance by means of a frame $l$ and screws $n$. A rubber insertion $u$ is preferably provided between the margins of the plates $g$ and $h$, and the space left in the interior between the plates $g$ and $h$ is evacuated by means of a pump $p$ and suction pipe $w$ leading to a hole $i$ provided in one of the plates. As the covering plate $h$ is sufficiently elastic, it is pressed against the block by atmospheric pressure. Thus the atmospheric pressure acts simultaneously at all points of the block uniformly and completely removes the air from the interstices between the superposed films and filters. As soon as the vacuum is sufficiently strong, the adhesive frames are heated, for instance by means of an electrically heated apparatus, until they adhere firmly to the layers and form a tight closure. The heating apparatus $o$, (see Figures 3 and 4) may be made in the form of a frame exactly covering the strips $r$ of the block.

Any other suitable air exhausting and heating apparatus may be used.

After cooling, the block is removed from the air exhausting apparatus and provided along the edges of the superposed films and filters with a colloidal coating $m$ (for instance of celluloid), which ensures the maintenance of the vacuum within the block. By the vacuum the optical contact produced by the external air pressure is constantly maintained and the disadvantage of the short life of the sensitized layers is entirely eliminated, as they are entirely and permanently protected by the gaslight closure from injurious atmospheric action (oxidation of dyes, moisture, formalin vapours and the like) and will consequently keep for a practically unlimited time. The block is stiff and is about as thick as an ordinary glass plate.

In order to ensure, before development, that the component images shall be kept in exact register, holes, which are preferably exactly circular, are punched into the block, after exposure or before development, at the points clearly indicated on the back of the black supporting surface. By the superposition of these holes $p$, $q$, $s$, when copying, a very simple means is provided for ensuring the exact register of the component negatives $a$, $b$, $c$.

After the holes have been punched, the block is cut through with scissors at two parallel edges along the inner edge $v$, $z$, of the guttapercha strips, thus allowing the air to penetrate into the block, which will cause the films and filters to separate readily. Thus they may be separated before development without any danger of damage or deformation. After the card $k$ and the gelatine foils $d$, $e$ have been removed, the component negatives may be developed without the colour of the filters preventing the process of development being watched.

The holes $p$, $q$, $s$, for bringing the component negatives into register, are distributed over the edges, which are not cut off. Owing to these holes and to the cutting away of the two other strips, a part of the edge of the plate is lost (about 2 mm.), but this does not exceed the strip, which is in any case covered by the copying frame.

What we claim is:—

1. A method of manufacturing a composite photographic plate, more particularly for three colour photography, consisting in coating the edges of a number of sensitized films and colour filters so as to form narrow frames around the same, superposing the said films and filters on a common support, evacuating the air from the composite plate so formed and causing the said films and filters and support to adhere together in a gastight manner by heating the coatings of adhesive between the said component parts of the composite plate in vacuo, as and for the purpose set forth.

2. A composite photographic plate comprising in combination an opaque support, a plurality of sensitized films and a plurality of removable filter foils, entirely independent of the said films.

3. A composite photographic plate as claimed in claim 2 and having frames of an adhesive and gastight substance, between each two adjacent superposed layers forming the composite plate, as set forth.

4. A composite photographic plate as claimed in claim 2 and having a coating of a gastight substance, around its edge, as set forth.

5. A composite photographic plate comprising in combination an opaque support, a plurality of sensitized films, the sensitive emulsion of one of which is sensitive to the blue-violet part of the spectrum only, and a plurality of removable filter foils entirely independent of the said films, as set forth.

In testimony whereof we have signed our names to this specification.

LUDWIG v. TOLNAY.
LADISLAUS v. KOVÁSZNAY.